Sept. 1, 1925.  
G. F. KRIESEL  
ELECTRICAL VALVE GRINDER AND DRILL  
Filed April 17, 1922  
1,551,752  
2 Sheets-Sheet 1

Inventor,
Gustav F. Kriesel
By his Attorneys
James F. Williamson

Patented Sept. 1, 1925.

1,551,752

UNITED STATES PATENT OFFICE.

GUSTAVE F. KRIESEL, OF MINNEAPOLIS, MINNESOTA, ASSIGNOR TO BERTHA E. KRIESEL, OF MINNEAPOLIS, MINNESOTA.

ELECTRICAL VALVE GRINDER AND DRILL.

Application filed April 17, 1922. Serial No. 554,007.

*To all whom it may concern:*

Be it known that I, GUSTAVE F. KRIESEL, a citizen of the United States, residing at Minneapolis, in the county of Hennepin and State of Minnesota, have invented certain new and useful Improvements in Electrical Valve Grinders and Drills; and I do hereby declare the following to be a full, clear, and exact description of the invention, such as will enable others skilled in the art to which it appertains to make and use the same.

This invention relates to a hand drill or valve grinding tool and particularly to such a tool equipped with an electric motor and adapted to be electrically driven.

It is an object of this invention to provide such a tool enclosed in a simple and compact casing having no objectionable projecting parts and having an operating spindle projecting at one end and a comfortable and convenient grip handle at the other end of the casing.

It is a further object of this invention to provide means for controlling the speed of the motor, which means is disposed in the casing and has a handle for manipulating the same projecting to the outside of the casing. This handle is arranged in convenient relation to the grip handle of the tool so that the tool can be firmly held in position and the speed of the motor controlled by the same hand.

It is another object of the invention to provide a driving connection between the motor shaft and the operating spindle of the tool, whereby the spindle can be either rotated or oscillated when the motor is running and it is a still further object of the invention to provide means on the outside of the tool for adjusting the driving mechanism, as stated, and holding the same in adjusted position.

These and other objects and advantages of the invention will be fully set forth in the following description made in connection with the accompanying drawings in which like reference characters refer to the same parts throughout the different views, and in which Fig. 1 is a view in side elevation of the tool;

Figure 1:
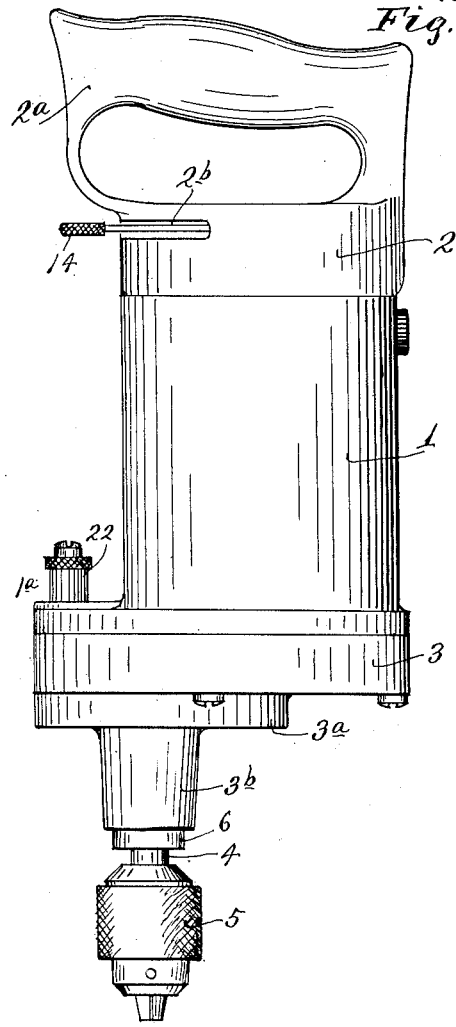

Referring to the drawings, the device comprises a casing having a central section 1 of cylindrical shape but having at its lower edge a flange extending thereabout, which is projected at one side of the casing to form a projecting step or flange 1ª. The casing 1 is formed at its top portion with a shoulder and the top section of casing 2 has its bottom cylindrical portion fitting over this shoulder and lying flush with the section 1. This section is firmly and rigidly secured to section 1 by bolts passing through the top thereof and engaging a transverse web extending across the top of section 1. The upper part of section 2 is formed as a grip handle 2ª extending across said section. The lower section 3 of the casing is provided and is of the same shape and size as the flange at the bottom of section 1 to which it is secured by spaced bolts. The section 3 has a cylindrical projection 3ª at its lower portion and a smaller extension 3ᵇ projecting downwardly therefrom.

The various sections of the casing are formed hollow and the projection 3ᵇ of section 3 is suitably bushed to provide the bearing for an operating spindle 4 projecting below the same, the lower end of which is provided with a chuck adapted to hold a drill or other tool, which chuck is of the usual standard construction comprising spaced circumferentially arranged jaws moved into clamping relation by a knurled sleeve 5. The spindle 4 is provided at its upper end with sliding arms 4ª and is held from vertical movement by a collar 6 contacting an anti-friction bearing disposed in the lower end of the extension 3ᵇ.

The main section 1 of the casing is provided with inwardly projecting, diametrically oppositely arranged lugs 1ᶜ to which are bolted the frame or pole pieces 7 of an electric motor, the field coils of which are shown as 8, which coils are suitably mounted and held in position in the frame member 7. The armature of the motor is designated as 9 and with the commutator 10 is mounted on a motor shaft 11 suitably journaled in bearings formed in transverse partitions at the top and bottom of section 1. The electrical leads in the motor are designated as 12 and pass out of the casing 1 through an insulating bushing inserted in the side thereof adjacent its top portion and a rheostat 13 is secured in the lower hollow part of section 2 for controlling the speed of said motor. This rheostat comprises a contact forming lever pivoted at one end and having a handle portion 14 at its other end, which lever is adapted to swing successively into contact with a series of resistance controlling contacts 14ª. It will be noted that the lever projects outside of the casing at one side of section 2 through the slot 2ᵇ so that the handle 14 is disposed beneath the handle 2ª. The motor shaft is equipped near the bottom of section 1 with a cooling fan 15 and air is drawn through apertures 1ᵇ and blown up past the motor parts into section 2 and out through apertures formed therein and through the handle 2ª.

Figure 2:
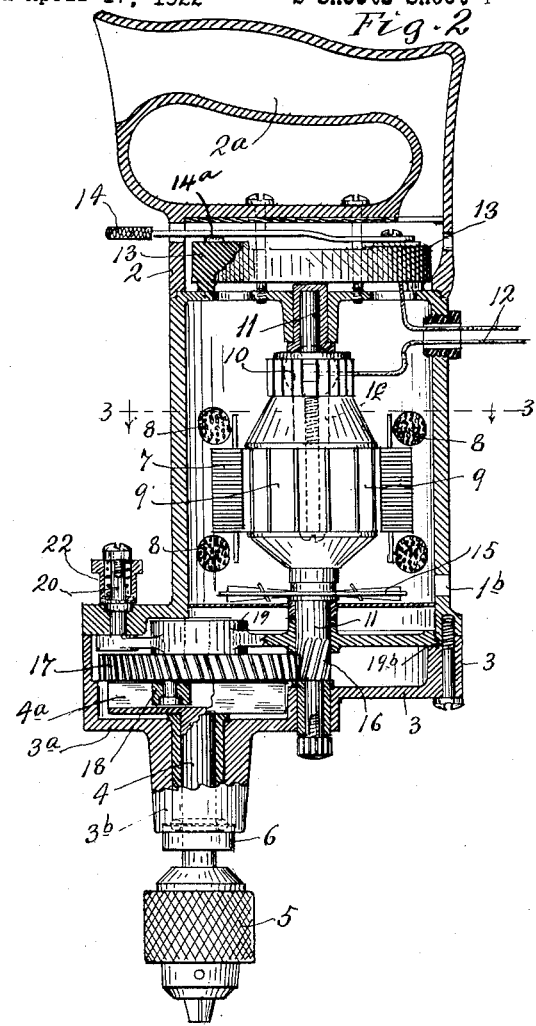
Fig. 2 is a vertical central section of the tool as seen in Fig. 1.
Figure 5:
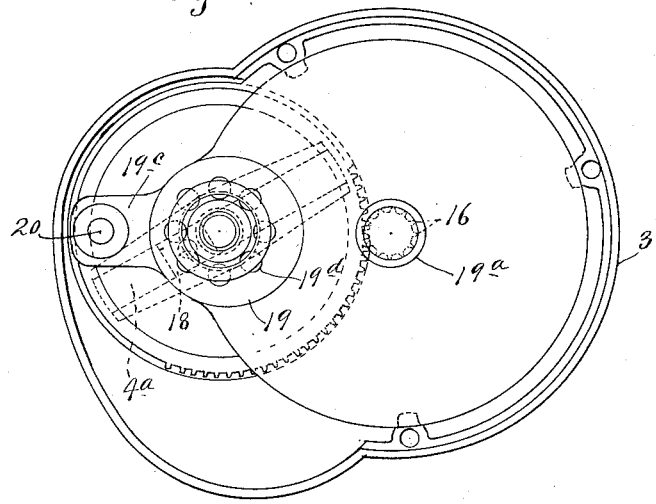
Fig. 5 is a plan view of the lower portion of the casing and the parts contained therein, the upper part being removed.

The lower end of the motor shaft 11 carries a small pinion 16 shown as in the form of a helical gear which is arranged to mesh with the drive of the helical gear 17. The gear 17 has eccentrically secured to its under face a rotatably mounted block member 18, which block member fits and slides in the groove or slot in the arm 4ª. The gear 17 has an upwardly projecting central hub which is mounted and secured for rotation in a swinging member 19, suitable ball bearings 19ᵈ being arranged in the gear bearing. This swinging member or arm 19 has a hub 19ª journaled about the motor shaft 11, about which the said arm is adapted to swing, and the arm is further provided with a circular disk portion 19ᵇ having a slight shoulder at its peripheral edge and this disk portion and shoulder are arranged to bear against and be guided by the side wall of the casing section 1 and to rest upon a ledge formed in said casing, as clearly shown in Figs. 2 and 5. The member 19 is also provided with a laterally projecting arm 19ᶜ in which is secured an upstanding stem member 20, which member is adapted to pass upwardly through a slot 21 formed in the flange 1ª and which extends concentrically about the center of shaft 11. The slot 21 is provided at each end with a shallow cylindrical recess opening upwardly of the flange 1ª. A sleeve member 22 is rotatably mounted on the stem member 20 and has an enlarged bore at its upper end adapted to receive a coiled spring which is held therein by a headed screw threaded into the top of the member 20, the head of which screw is of slightly less diameter than the diameter of said bore. The sleeve 22 has a projecting knurled flange at its upper portion and is provided at its lower portion with a short reduced portion or shoulder of a diameter to fit in the cylindrical recesses at the ends of the slot 21. With this structure, it is apparent that the sleeve 22 can be raised to bring its shouldered end out of the recesses and then moved along to move the stem 20 in slot 21 and to swing arm 19 about shaft 11.

Figure 3:
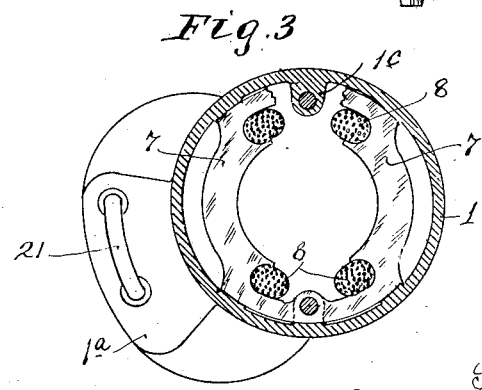
Fig. 3 is a transverse section taken on the line 3—3 of Fig. 2.
Figure 4:
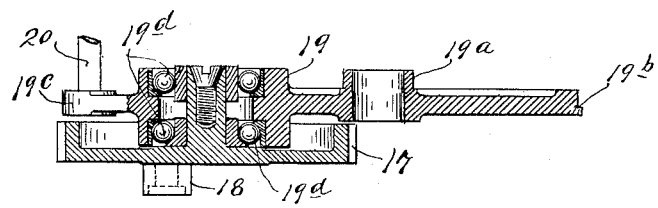
Fig. 4 is a fragmentary section similar to the section shown in Fig. 2.

The operation of the device is as follows:
If the tool is to be used as a drill, the sleeve 22 will be disposed in the recess of slot 21 shown at the upper portion of Fig. 3 or to bring the arm 19 into the position shown in Fig. 5. In this position, the axis of gear 17 is alined with the axis of spindle 4. The current now being turned on, the motor will drive the gear 17 through the pinion 16 and gear 17 will drive spindle 4 through the block 18. The block 18, as clearly shown in Fig. 5, will move about the center of the spindle 4 and said spindle will thus be rotated.

Figure 6:
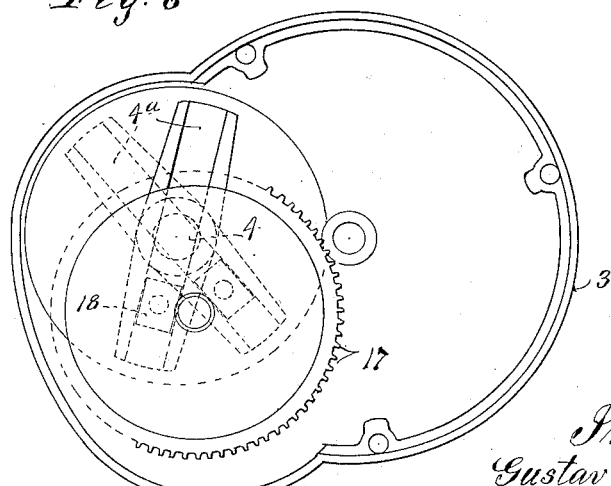
Fig. 6 is a plan view of the lower part of the casing similar to Fig. 5, with some of the parts thereof removed.

If an oscillation of spindle 4 is desired, as when the tool is used to grind valves, the sleeve 22 will be moved into the recess at the other end of the slot 21, to swing arm 19 about shaft 11 into the position shown in Fig. 6. Gear 17 is now brought into eccentric relation with spindle 4 and when the gear is driven, the block 18 will move about the center of gear 17 but entirely at one side of the center of spindle 4 and the arm 4ª and spindle 4 will thus merely be oscillated. The driving mechanism will thus be shifted to give either the rotatable movement of spindle 4 or the oscillating movement thereof and said mechanism will be held in its adjusted position by the engagement of sleeve 22 with the appropriate recess.

The speed of the motor can be regulated as desired by the rheostat 13 and the handle 14 for regulating the same can be conveniently moved by the fingers of the same hand that is gripping the handle 2ª and manipulating the tool.

From the above description it is seen that applicant has provided a simple, compact and efficient electrically operated tool. The casing enclosing the same is comparatively smooth and has few projecting parts. The tool can be conveniently manipulated by and brought to the desired operating position by the handle 2ª and the speed thereof can be conveniently regulated by handle 14. The operating parts are all contained in the casing which will be substantially dust proof, said parts are few in number and when once assembled, require little attention for maintenance or repair.

It will, of course, be understood that various changes may be made in the form, details and arrangement of the parts of applicant's device without departing from the scope of his invention, which generally stated, consists in the matter shown and described and set forth in the appended claims.

What is claimed is:

1. A tool of the class described having in combination, an operating spindle having a slotted arm at its inner end, a driving shaft, a connection between said spindle and driving shaft including a pinion on said shaft, a gear driven by said pinion having a block eccentrically secured thereto and disposed in the slot of said slotted arm, and means mounted for swinging movement about the axis of said driving shaft carrying said gear whereby said gear can be swung to bring it and the said spindle into axial alinement or into eccentric relation.

2. A tool of the class described, comprising a casing, a spindle projecting at one end thereof, a slotted arm rigidly secured to the spindle at its inner end, a gear disposed above said arm and having a rotatable block eccentrically mounted thereon, said block being disposed in the slot of said slotted arm, a pinion driving said gear and a swinging arm carrying said gear, means for swinging said arm to move said gear and spindle into axial alinement or into eccentric relation, and means secured to said arm and projecting outside of the casing for swinging said arm and holding the same in adjusted position.

3. A tool of the class described having in combination, a casing, an operating spindle journaled therein and projecting from its lower end, a motor in said casing, a motor shaft journaled in said casing, a gear driven from said shaft and having means secured thereto for driving said spindle, said gear being mounted in a member swingable about said motor shaft, and means connected to said member and extending outside of said casing for swinging the same to bring said gear and spindle into axial alinement or into eccentric relation.

4. A tool of the class described having in combination, a casing, an operating spindle journaled therein and projecting from one end thereof, a motor and motor shaft journaled in said casing, a gear driven from said shaft and having a driving connection with said spindle including a sliding member, an arm arranged for swinging movement about said motor shaft on which said gear is mounted, a spindle secured to said arm and projecting through a slot in said casing, and a handle outside of said casing secured to said spindle and movable to swing said arm to bring said gear and spindle into axial alinement or into eccentric relation.

5. A tool of the class described having in combination, a casing, an operating spindle journaled therein and projecting from one end thereof, a driving shaft in said casing, a gear driven from said shaft, an arm mounted for swinging movement about the driving shaft having a semicircular portion engaging the wall of the casing for guiding movement, said gear being journaled in and carried by said arm, and means connected to said arm and projecting outside of the casing for swinging the same.

6. A tool of the class described having in combination, a casing, an operated spindle journaled therein and projecting from the lower end thereof, a driving shaft in said casing, means connecting said spindle and driving shaft including a continuously rotated gear, means connecting said gear and spindle for rotating said spindle or for oscillating said spindle, and means for adjusting said means by swinging said gear about an axis spaced from and parallel to its axis so that said spindle will be either continuously rotated or oscillated.

7. A tool of the class described having in combination, a generally cylindrical casing, a grip handle secured to and extending across the top of said casing, said casing having a lateral projection at its lower end forming a step thereon, an operating spindle journaled in said casing, a driving shaft journaled in said casing, an adjustable driving connection between said driving shaft and spindle whereby said spindle can be rotated or oscillated, and means movable outside of said casing and on said step for adjusting the driving mechanism.

8. A tool of the class described having in combination, a casing, an operated spindle journaled therein and projecting from the lower end thereof, a driving shaft in said casing, mechanism connected to and operated from said shaft for driving said spindle, said mechanism being swingable about the axis of said driving shaft, and means disposed outside of said casing for swinging said mechanism into different positions, said mechanism being constructed and arranged so that in one position it will rotate said spindle and when in another position will oscillate said spindle.

9. A tool of the class described having in combination, a casing, an operating spindle journaled therein and projecting therefrom, a driving shaft in said casing, mechanism connected to and operated from said shaft for driving said spindle including a driving gear, said mechanism and gear being swingable about the axis of said driving shaft, and means for swinging said mechanism into different positions, said mechanism being constructed and arranged so that in one position it will rotate said spindle and when in another position will oscillate said spindle.

In testimony whereof I affix my signature.

GUSTAVE F. KRIESEL.